United States Patent [19]

Ikeda et al.

[11] Patent Number: 5,536,926
[45] Date of Patent: Jul. 16, 1996

[54] OPTICAL SCANNER AND OPTICAL SCANNING DEVICE, OPTICAL SENSOR, CODED DATA READER, AND POS SYSTEM WHICH EMPLOY THE OPTICAL SCANNER

[75] Inventors: Masaaki Ikeda; Hiroshi Goto, both of Ibaragi-ken; Kenji Takemura, Osaka-fu; Hidenobu Umeda, Ibaragi-ken; Masahiro Yoneda, Ibaragi-ken; Atsushi Irie, Ibaragi-ken; Kiyotoshi Ookura, Ibaragi-ken; Norimasa Yamanaka, Osaka-fu; Hiromi Totani, Ibaragi-ken, all of Japan

[73] Assignee: Omron Corporation, Kyoto, Japan

[21] Appl. No.: 361,381

[22] Filed: Dec. 22, 1994

[30] Foreign Application Priority Data

Dec. 22, 1993 [JP] Japan .................................. 5-346284
Apr. 27, 1994 [JP] Japan .................................. 6-113515

[51] Int. Cl.$^6$ .................................................. G06K 7/10
[52] U.S. Cl. ........................ 235/462; 235/472; 359/224
[58] Field of Search ............................ 235/462, 472, 235/470; 359/199, 213, 214, 224

[56] References Cited

U.S. PATENT DOCUMENTS

| | | | |
|---|---|---|---|
| 4,230,393 | 10/1980 | Burke, Jr. | 359/224 |
| 5,281,801 | 1/1994 | Shepard et al. | 235/462 |

FOREIGN PATENT DOCUMENTS

| | | | |
|---|---|---|---|
| 471291 | 2/1992 | European Pat. Off. | 359/214 |
| 63-34508 | 2/1988 | Japan | 359/214 |

*Primary Examiner*—John Shepperd
*Attorney, Agent, or Firm*—Dickstein, Shapiro & Morin

[57] ABSTRACT

An optical scanner and an optical scanning device, an optical sensor unit, a coded data reader, and a POS system employing an optical scanner. The optical comprises an elastically deformable element, a vibrational input segment disposed at a first end of the elastically deformable element, a driven segment disposed at a second end of the elastically deformable element, a vibration source for inducing vibration in the vibrational input segment, whereby the vibration induced in the vibrational input segment produces elastic deformation of the elastically deformable element and consequent movement of the driven segment, and a stop for limiting a range of the movement of the driven segment.

23 Claims, 13 Drawing Sheets

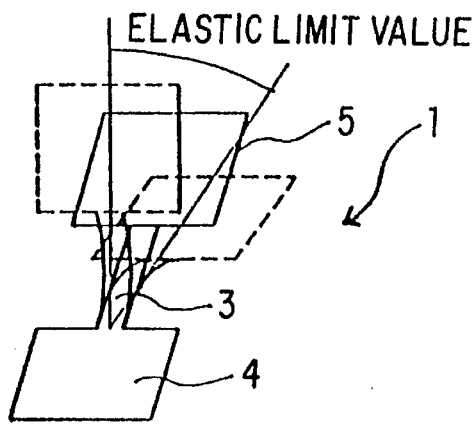
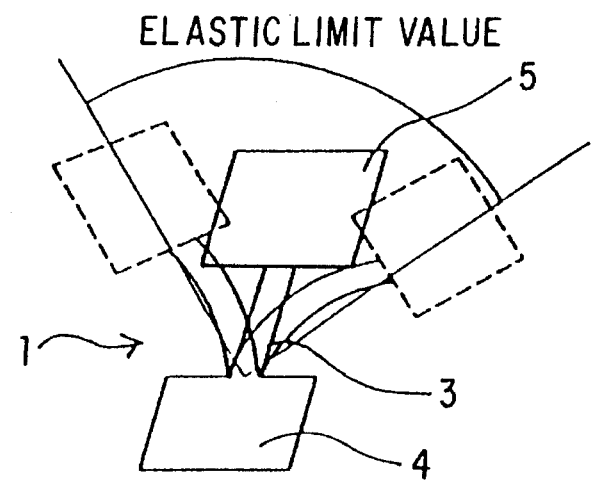
FIG. 3(a)
FIG. 3(b)
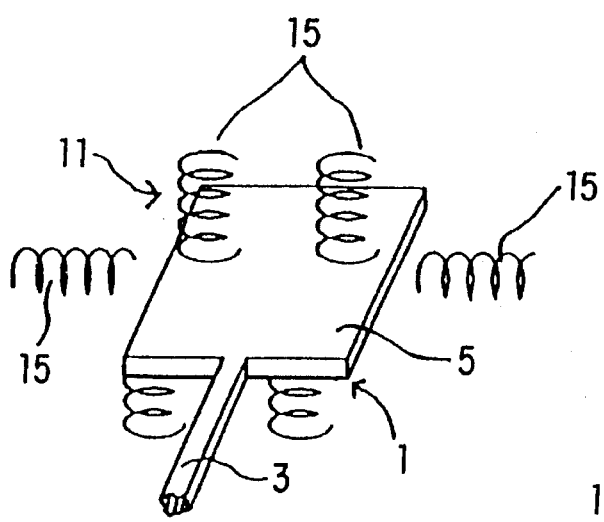
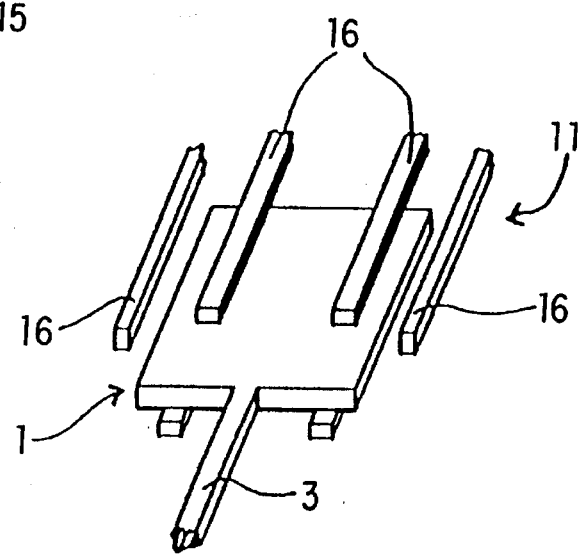
FIG. 4(a)
FIG. 4(b)

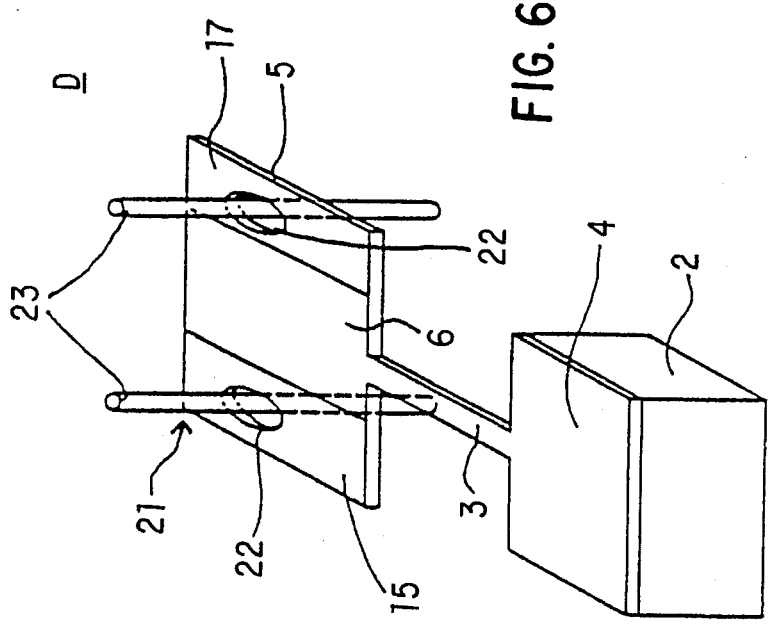
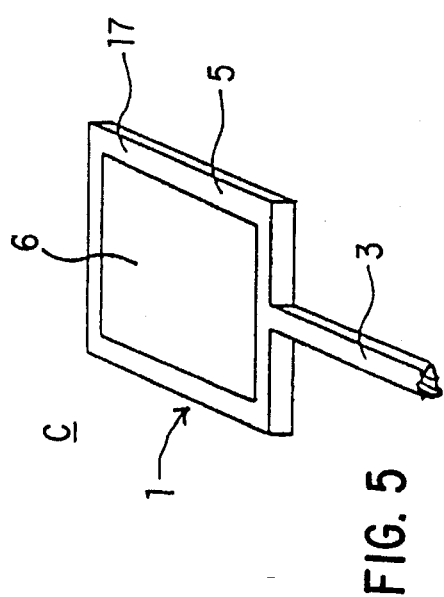
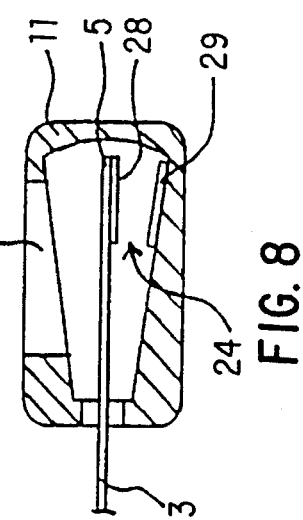
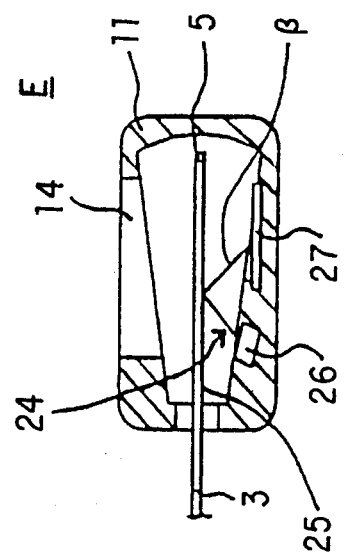

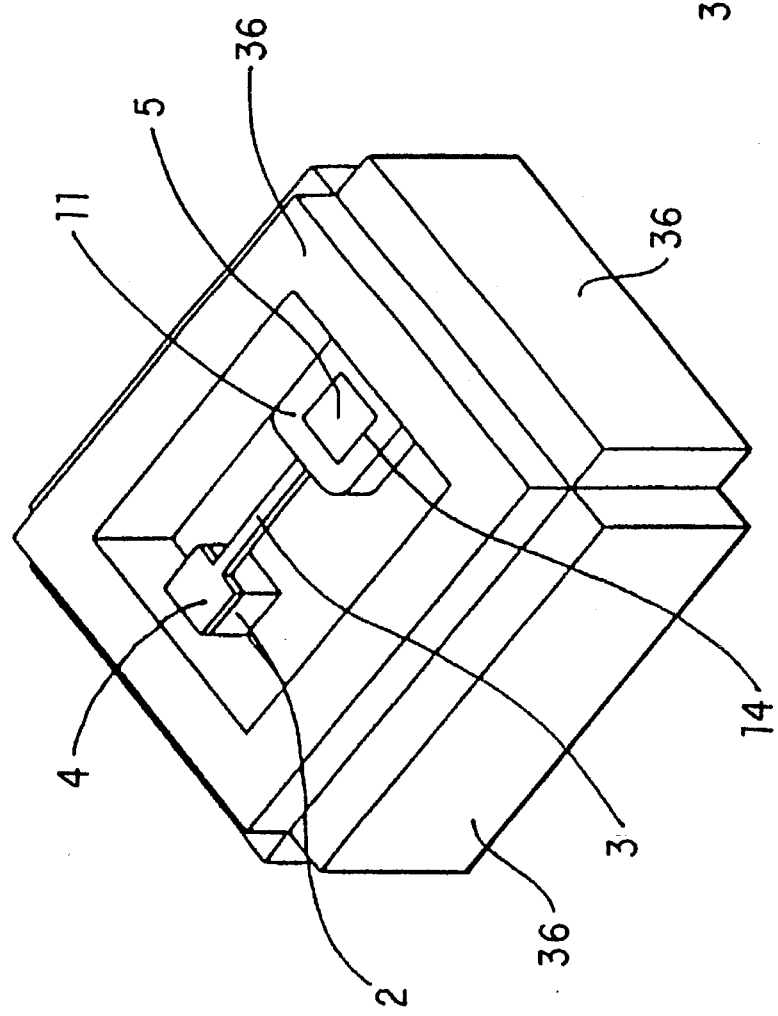
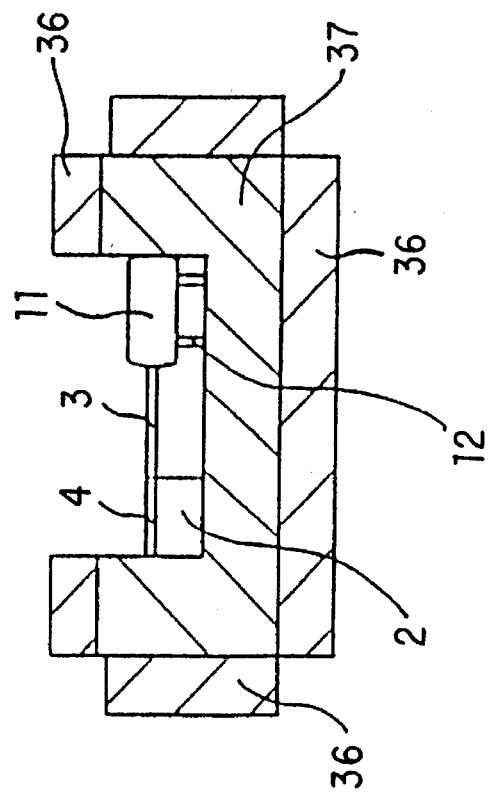
FIG. 10(a)
FIG. 10(b)

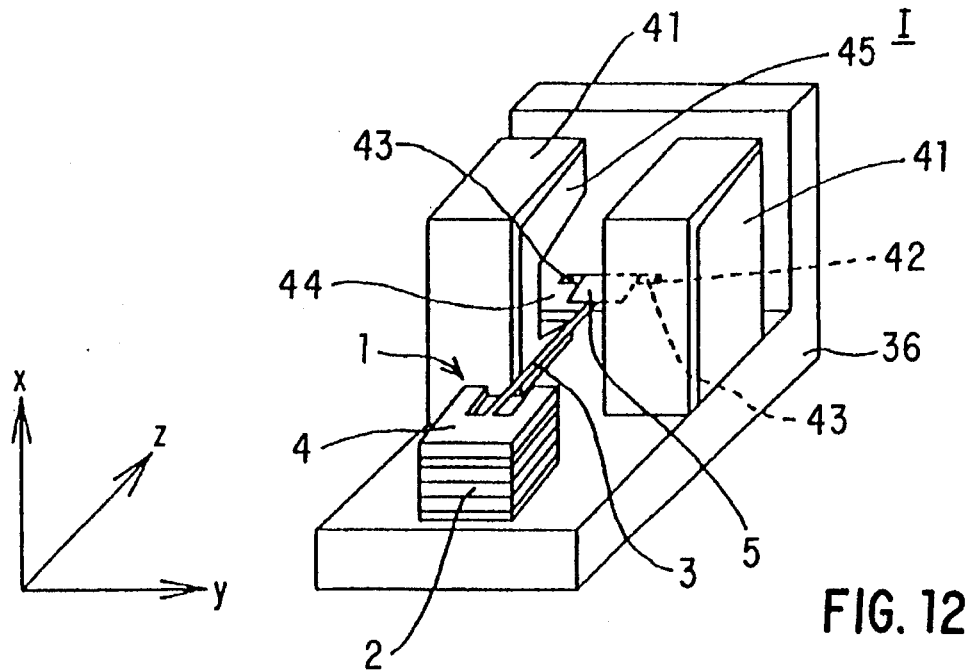
FIG. 12
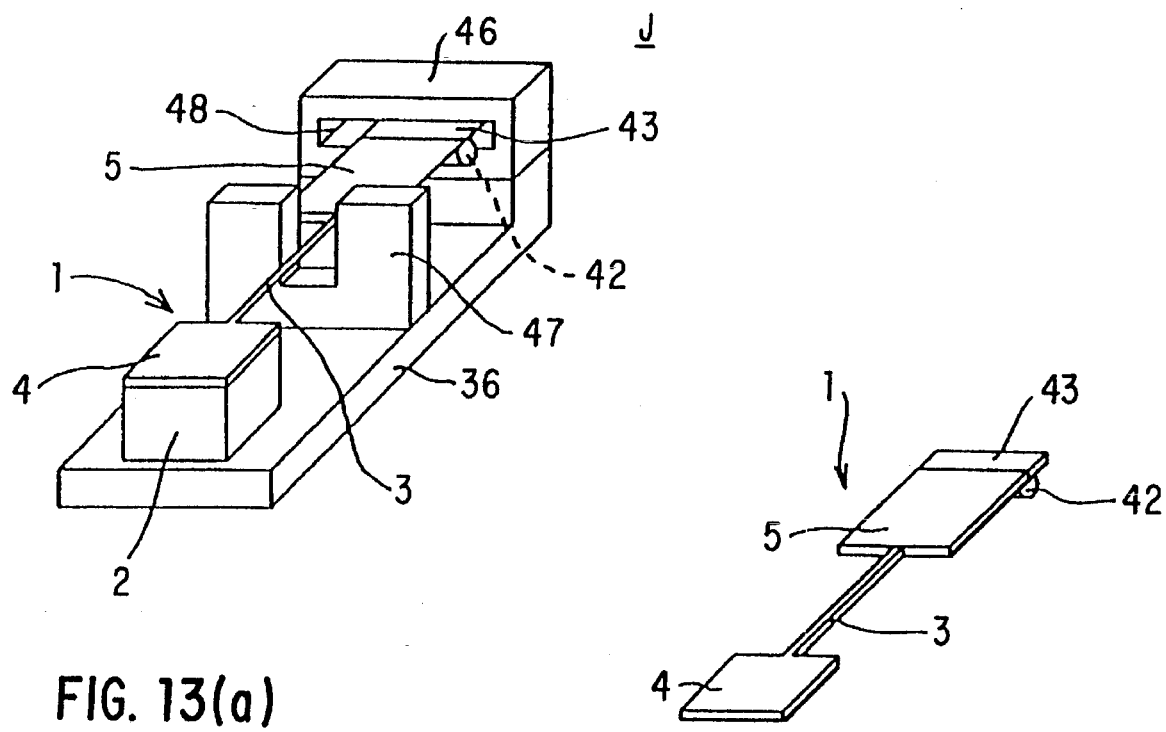
FIG. 13(a)
FIG. 13(b)

OPTICAL SCANNER AND OPTICAL SCANNING DEVICE, OPTICAL SENSOR, CODED DATA READER, AND POS SYSTEM WHICH EMPLOY THE OPTICAL SCANNER

FIELD OF THE INVENTION

This invention relates to an optical scanner and to an optical scanning device, an optical sensor unit, a coded data reader, and a POS system which employ the optical scanner. More specifically, this invention relates to an optical scanner which scans a beam of light for use in a laser beam printer, a bar code scanner, or a beam scanning type area sensor.

BACKGROUND OF THE INVENTION

The applicants have developed a compact and inexpensive optical scanner which is based on a novel principle. This scanner is disclosed in Japanese Patent Publication 4-95917. FIG. 1 shows a simplified perspective view of such a scanner designated generally as optical scanner A. Scanner A comprises a vibrator 1, formed from a thin plate, and a small drive source 2. The drive source 2 comprises a device which generates microscopic vibrations in a piezoelectric or magnetostrictive vibrator or the like. Vibrator 1 is shaped as shown in FIG. 1 and comprises an elastically deformable shaft 3, which functions as a torsion bar capable of deforming in at least the bending mode of deformation, a vibrational input segment 4 disposed at one end of the shaft 3, and a driven segment 5 disposal at another end of the shaft 3. The shaft 3, input segment 4, and driven segment 5 are formed as a unit from a single silicon wafer. Further, driven segment 5 is symmetrical with respect to an axis P of deformable shaft 3. Also, a mirror surface 6 is formed on the driven segment 5 by processing the surface of driven segment 5.

When vibrational input segment 4 is induced by drive source 2 to vibrate at a frequency equal to the resonant frequency $f_B$ of the bending mode of deformable shaft 3, shaft 3 vibrates in that mode, driven segment 5 vibrates by bending in a direction $\Theta_B$, and driven segment 5 rotates in the direction $\Theta_B$. If at this time a light beam α strikes mirror surface 6 on driven segment 5, the reflected light beam α will be scanned over an angle which is twice as large as the angle of rotation of driven segment 5.

If optical scanner A undergoes a severe shock or vibration resulting, for example, from being dropped or from unintentional vibration induced by drive source 2, the plastic deformation of shaft 3 may be affected and various parts of optical scanner A, in particular shaft 3, may be damaged. As a result, the scanning characteristics of optical scanner A may change significantly in which case it is possible that the proper scanning angle of reflected light beam α will not be achieved, or even that light beam α will no longer be scanned.

SUMMARY OF THE INVENTION

This invention was developed in view of the shortcomings of prior art scanners as described above. Its objective is to prevent changes in the scanning characteristics which result from severe external shock or vibration.

The optical scanner of this invention has a deformable shaft capable of at least one mode of elastic deformation; a vibrational input segment on one end of the aforesaid shaft which transmits induced vibration to that element; a driven segment on the other end of the aforesaid deformable shaft which rotates according to the mode of elastic deformation of that shaft; and a source of vibration which causes the aforesaid vibrational input segment to vibrate. This optical scanner is distinguished by the fact that it has a stop to limit the range of movement of the aforesaid driven segment.

The area of the mirror provided on the aforesaid driven segment to reflect a light beam should be less than the area of that driven segment; and the portion of the aforesaid driven segment which comes in contact with the aforesaid stop should not be the mirror surface.

The stop, which is fashioned so as to surround the aforesaid driven segment, could have in its center a window which allows the light beam emitted by a light source toward the mirror surface on the aforesaid element to strike that mirror surface, and, once reflected, to pass back out through the window.

The stop could consist of a rod or rods inserted into at least one hole in the aforesaid driven segment.

There could be a tab on the front end of the aforesaid driven segment which should come in contact with the aforesaid stop.

The aforesaid driven segment and the aforesaid tab should have a narrow portion, on the outer periphery of which the aforesaid stop can be provided. The aforesaid tab could also be placed on the outer periphery of the aforesaid deformable shaft.

In these optical scanners, at least the portion of the aforesaid stop which makes contact with the aforesaid driven segment; or the portion of that stop which makes contact with the aforesaid tab; or the portion of that stop which makes contact with the aforesaid deformable element should be composed of a substance with a small spring modulus. It is desirable that the range of movement of the aforesaid driven segment be less than the elastic limit value of the aforesaid deformable element.

On the aforesaid stop, there can be a detector device to detect the operating state of the aforesaid driven segment. This detector device may function as follows: there may be on the aforesaid stop a luminous element and a photodetector element. The light beam emitted by the luminous element can be projected onto the aforesaid driven segment or the aforesaid tab. When the light beam reflected by the aforesaid driven segment is detected by the aforesaid photodetector element, the operating state of the aforesaid driven segment will be detected. Alternatively, the device may have a luminous element and a photodetector element facing each other on opposite sides of either the aforesaid narrow portion of the tab or the aforesaid deformable shaft. The light beam emitted by the said luminous element is projected in the direction of the aforesaid photodetector element. When the beam is intercepted by the said narrow portion or by the said deformable shaft, the quantity of light detected will vary. This variation, detected by the aforesaid photodetector element, can be used to determine the operating state of the aforesaid driven segment. Another possibility would be to have two opposed electrodes, one on the aforesaid stop and the other on either the aforesaid driven segment or on the aforesaid tab. Changes in the capacitance between the two electrodes could then be used to detect the operating state of the aforesaid driven segment.

The detector device to detect the operating state of the driven segment can detect its scanning position.

The first optical scanning device of this invention is distinguished by the following features. It has an optical scanner equipped with the aforesaid detector device to detect the operating state of the driven segment. When the aforesaid source of vibration is driven, the scanning device will cause a beam of light to scan. Based on the output of the aforesaid detection device, the scanning of the aforesaid beam of light can be controlled via feedback. The second optical scanning device of this invention is distinguished by the fact that it has a display, on which is shown the scanning state of the aforesaid beam of light, and an alarm, both of which depend on the output of the aforesaid detector device.

The third optical scanning device of this invention is equipped with the aforesaid optical scanner. When the aforesaid source of vibration is driven, the scanning device will cause a beam of light to scan. This device is distinguished by the fact that the aforesaid optical scanner is contained in a package in which it is surrounded by a damper to absorb shock and vibration. This insures that any shock or vibration experienced by the said optical scanning device will not be communicated to the aforesaid optical scanner.

The optical sensor unit of this invention has any one of the optical scanning devices described above; a light source which emits a beam of light; a photodetector element which detects the intensity of the light; and a signal processing device which processes the electrical signals output by the photodetector element. This optical sensor unit is distinguished by the fact that the aforesaid scanning device scans a beam of light emitted by the aforesaid light source, and the light reflected by an object is detected so as to detect the presence, shape, or other qualities of the object.

The coded data reader of this invention is distinguished by the fact that the object to be detected has on it coded data in the form of a bar code, a multi-stage bar code, or two-dimensional code in the form of a matrix, and by the fact that the aforesaid coded data are read by the aforesaid optical sensor unit.

The POS system of this invention is distinguished by the fact that it has at least one of the aforesaid device to read coded data, and by the fact that it reads the coded data on each product; checks these data against product data, such as name of product and price, which were stored previously in an external memory unit; displays to the exterior the result of the data check; and stores this result in a second memory unit.

The optical scanner of this invention has a stop to limit the range of movement of the driven segment. Should the said optical scanner suffer severe shock or vibration, the stop will damp the vibration. Even if movement (or vibration) is generated in the driven segment, it will not exceed the elastic limit value of the deformable shaft. Thus the deformable shaft will not undergo plastic deformation, nor will it be damaged. The scanning characteristics of the optical scanner will not vary, and we will have succeeded in providing an optical scanner which is strongly resistant to both shock and vibration.

The mirror surface which reflects the light beam is smaller than the driven segment, and only the non-mirrored portion of the element makes contact with the stop. This insures that when the driven segment comes in contact with the stop, the surface of the mirror is not scratched or degraded. The light beam will be scanned in a stable fashion over a long period of time.

To allow the beam to be scanned, a window should be provided in the stop so as to surround the driven segment. This window will allow the light beam to strike the mirror surface on the driven segment and, once reflected, to pass back out to the exterior.

A simple stop can be provided by creating at least one hole in the driven segment and inserting a rod into that hole.

Providing a tab on the front end of the driven segment to make contact with the stop will insure that the beam of light which strikes the mirror surface of the driven segment or is reflected by it will have a wide optical path. Few restrictions will be necessary to guarantee that the light beam will have a wide path, and the structure of the optical scanning device or optical sensor unit can be simplified. Naturally, the fact that the mirror and the stop do not make contact with each other insures that the light beam will be scanned in a stable fashion over a long period of time.

If the driven segment and the tab have a narrow portion on the outer periphery of which the stop is provided, the configuration of the stop will be simplified, and the part count and manufacturing cost can be reduced. The construction of the stop will also be simplified.

If, in these optical scanners, at least the portion of the stop which makes contact with the driven segment; or the portion of that stop which makes contact with the tab; or the portion of that stop which makes contact with the deformable shaft is composed of a substance with a small spring modulus, the shock can be mitigated when the driven segment or other portion of the scanner makes contact with the stop. This will protect the optical scanner more effectively from shock. If the range of movement of the driven segment is limited so that it is less than the elastic limit value of the deformable shaft, plastic deformation of the deformable shaft can be safely prevented.

On the stop there is a detector device which detects the operating state of the driven segment. This will allow the operator to be aware of any abnormal vibration of the driven segment as well as its scanning position. This detector device allows several other functions to be provided, including a display to show scanning position and an alarm to indicate severe shock or vibration. It also allows the scanning of the beam to be controlled by feedback. The use of this optical scanner enables us to provide a compact optical scanning device which is strongly resistant to shock and vibration and has a full array of functions.

The third optical scanning device of this invention has a damper to absorb shock and vibration, so as to insure that any shock or vibration experienced by the optical scanning device will not be communicated to the optical scanner. This mitigates the effect of shock on the optical scanner and prevents the vibrator from being separated from the drive source by shock or other accident. It also improves the resistance of the scanning device to shock and vibration.

With this invention, an optical scanning device can be realized which is highly resistant to shock and vibration. The use of such an optical scanning device will enhance the mechanical reliability of an optical sensor unit which can recognize the shape of an object; a data reader which can read the coded data in bar codes, multi-stage bar codes, or two-dimensional matrix codes; or a POS system employing such a data reader.

BRIEF DESCRIPTION OF THE DRAWING

FIGS. 3(a) and 3(b) show the elastic limit value of a vibrator in the vertical and horizontal directions, respectively.

FIGS. 4(a) and 4(b) are perspective views of the stop of an optical scanner which is another embodiment of this invention.

FIG. 5 is a cut-away perspective view of the vibrator of an optical scanner which is yet another embodiment of this invention.

FIG. 6 is a perspective view of the stop of an optical scanner which is yet another embodiment of this invention.

FIG. 7 is a cut-away cross sectional view of an optical scanner which is yet another embodiment of this invention.

FIG. 8 is a cut-away cross sectional view of an optical scanner which is yet another embodiment of this invention.

FIGS. 10(a) and 10(b) are a perspective view and a cross sectional view, respectively, showing the mount of the optical scanner in the same optical scanning device.

FIG. 12 is a perspective view of an optical scanner which is yet another embodiment of this invention.

FIG. 13(a) is a perspective view of an optical scanner which is yet another embodiment of this invention.

FIG. 13(b) is a perspective view of the vibrator of the same optical scanner.

DETAILED DESCRIPTION OF THE INVENTION

Figure 1:
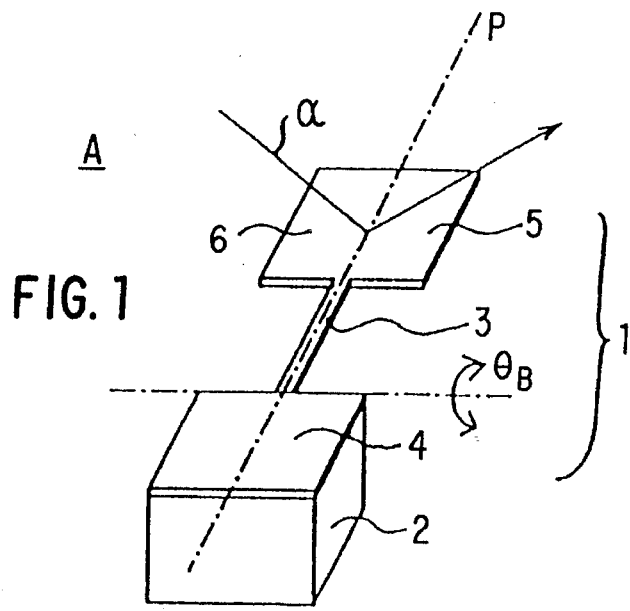
FIG. 1 is a simplified perspective view of an optical scanner belonging to the prior art.
Figure 2A:
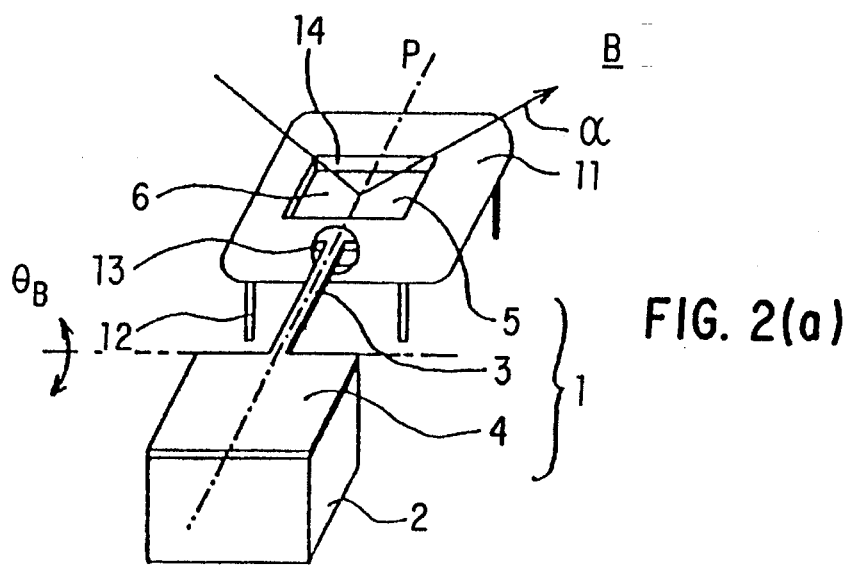
FIGS. 2(a) and 2(b) are a simplified perspective view and a cut-away cross sectional view, respectively of an embodiment of this invention.
Figure 2B:
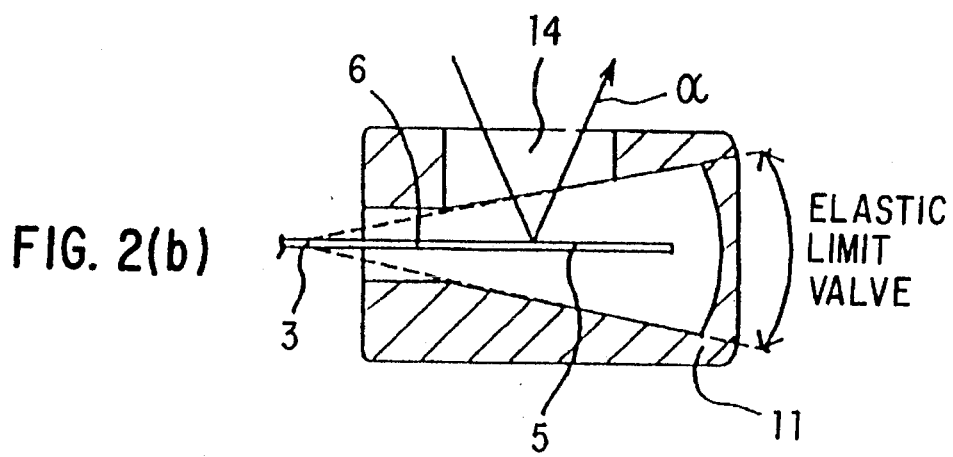

FIGS. 2(a) and 2(b) show, respectively, a perspective view of optical scanner B according to this invention, and a cut-away cross sectional view of scanner B. Optical scanner B comprises a vibrator 1 formed from a thin plate, a small drive source 2, which generates microscopic vibration in a piezoelectric or magnetostrictive vibrator, and a stop 11, which curtails the excessive vibration of driven segment 5. Vibrator 1 is shaped as shown in FIG. 1, and it has a vibrational input segment 4 on one end of elastically deformable shaft 3. Shaft 3 is a torsion bar capable of deforming in at least the bending mode of deformation. On the other end of shaft 3 is driven segment 5. Preferably, the shaft 3, input segment 4, and driven segment 5 are formed as a unit from a single silicon wafer. Driven segment 5 is symmetrical with respect to the axis P of deformable shaft 3. Mirror surface 6 is formed by processing substantially the entire surface of driven segment 5.

Stop 11 is held substantially parallel to vibrator 1 by supports 12. Into hole 13, in the side of the stop 11, is inserted deformable shaft 3. Driven segment 5 is contained within stop 11. The stop 11 has the form of a hollow casing which allows driven segment 5 to vibrate within the elastic limit values of deformable shaft 3. Both vertical and horizontal vibration of segment 5 are checked, as shown in FIGS. 3(a) and 3(b), as well as all other modes of vibration. It is, of course, desirable to fashion stop 11 so as not to curtail vibration within the range of the elastic limit values of the shaft 3. Opening 14 is provided in stop 11 so as to correspond to mirror surface 6 on driven segment 5. This opening insures that light beam α, emitted by the light source (not shown), will not be impeded as it strikes mirror surface 6 or is reflected by it.

When vibrational input segment 4 is induced by drive source 2 to vibrate at a frequency equal to the resonant frequency $f_B$ of the bending mode of deformable shaft 3, shaft 3 will vibrate in that mode, driven segment 5 will vibrate by bending (in direction $\Theta_B$), and segment 5 will be made to rotate in that direction (direction $\Theta_B$). If a light beam α is projected through opening 14 onto mirror surface 6 on driven segment 5, the reflected light beam α will be scanned over an angle which is twice as large as the angle of rotation of driven segment 5. If at this time the scanning device experiences a shock or vibration from the exterior which could give rise to vibrations exceeding the elastic limit value of deformable shaft 3, in, for example, the vertical plane of segment 5, as shown in FIG. 3(a), segment 5 will come in contact with the upper and lower interior surfaces of stop 11. Its movement will be suppressed, and it will not vibrate beyond the elastic limit value. If the scanning device experiences a shock or vibration in the horizontal plane of segment 5, as shown in FIG. 3(b), segment 5 will come in contact with the left and right interior surfaces of stop 11. Its movement will be suppressed, and it will not vibrate beyond the left-right elastic limit value. Vibrator 1 will not be damaged, and deformable shaft 3 will not undergo plastic deformation. Even if deformable shaft 3 bends along its axis P, the degree to which it can bend will be limited by stop 11, and shaft 3 will not sustain damage. This type of scanner B, then, has improved resistance to shock and vibration, and lower incidence of abnormal scanning of light beam α.

The material chosen for stop 11 of this invention is not specifically limited; however, if a material is used which has a sufficiently small spring modulus, the shock of driven segment 5 making contact with stop 11 will be mitigated more effectively. It would, for example, be acceptable to use rubber sheeting, plastic, or some similar material. It would also be possible, though it is not pictured, to cover the inner surface of a casing made from a rigid substance with a material whose spring modulus is small, such as rubber sheeting.

Alternatively, it would be possible to fashion in a casing made of a rigid material (not pictured) a stop 11 in the form of leaf springs above, below, and to the left and right of driven segment 5 (FIGS. 4(a) and (b)), which could absorb shock mechanically. Springs 15 and cantilever elastic beams 16 are examples of such a stop.

FIG. 5 shows a cut-away perspective view of vibrator 1 in optical scanner C, another embodiment of this invention. Contact area 17 is provided on the edge of mirror surface 6 on driven segment 5. In optical scanner B, pictured in FIG. 2, the entire surface of driven segment 5 is covered by mirror surface 6. When segment 5 comes in contact with the inner surface of stop 11, mirror surface 6 is scratched, and reflected light beam α is degraded. In scanner C, contact area 17 is provided on the edge of mirror surface 6, so the mirror surface does not come in direct contact with stop 11.

This prevents surface 6 from being abraded, and it insures that reflected light beam α will suffer little degradation despite long use of the scanner.

FIG. 6 is a rough sketch showing the configuration of stop 21 in optical scanner D, yet another embodiment of this invention. Two oblong holes 22 are provided, one in each contact area 17 on either side of driven segment 5, which have their major axes parallel to the axis of driven segment 5. Rods 23 are inserted into holes 22. When optical scanner D experiences a severe shock or vibration, and vibration greater than the elastic limit value of deformable shaft 3 is induced, rods 23 will come in contact with the edges of holes 22. The vibration of driven segment 5 will be controlled, and the plastic deformation of deformable shaft 3 will be curtailed just as in the first embodiment. This will minimize aberrations in the scanning of light beam α. In all of the above optical scanners, which are embodiments of this invention, severe shock or vibration is prevented from damaging or plastically deforming vibrator 1.

Optical scanners E and F, which are pictured in FIGS. 7 and 8, respectively, have a detector device 24 which detects the scanning position and state of vibration of driven segment 5 in the aforesaid optical scanner B. In optical scanner E, pictured in FIG. 7, a mirror surface 25 is formed by processing the undersurface of driven segment 5. On the inner surface of case-like stop 11 are luminous element 26, such as a light emitting diode (LED) or the like, and photodetector 27, such as a semiconductor position detection element (PSD) which detects the light beam β reflected by mirror surface 25. Vibration induced in deformable shaft 3 by drive source 2 causes driven segment 5 to vibrate in bending mode $\Theta_B$. Light beam β, emitted by luminous element 26, is reflected and scanned by mirror surface 25. The reflected beam β is detected by photodetector 27. By detecting the position of the beam β which strikes photodetector 27, we can determine the scanning position of driven segment 5. By analyzing the signal associated with the light detected by photodetector 27, we can also determine the vibrational state of driven segment 5.

In optical scanner F, pictured in FIG. 8, capacitor C is formed between movable electrode 28, which is formed on the lower surface of driven segment 5, and fixed electrode 29, which is formed on the inner surface of case-like stop 11 so that it faces electrode 28. When driven segment 5 vibrates in bending mode $\Theta_B$ in response to vibration induced in deformable shaft 3 by drive source 2, the distance between movable electrode 28 and fixed electrode 29 varies, and hence the capacitance of capacitor C varies. By obtaining the capacitance of C, then, we can find the scanning position and the vibrational state of driven segment 5.

Figure 9:
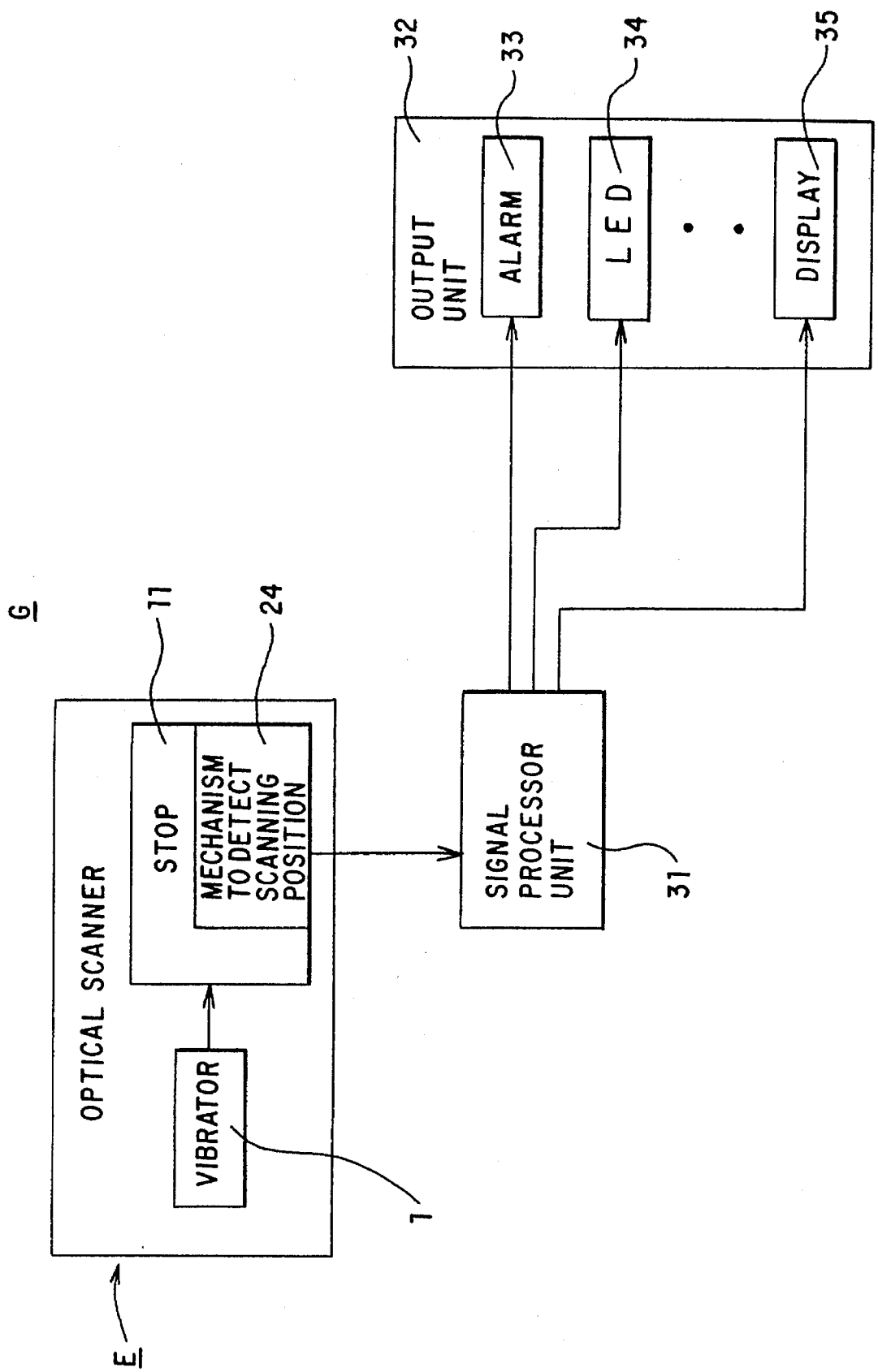
FIG. 9 is a block diagram of an optical scanning device which is an embodiment of this invention.

FIG. 9 is a diagram of the structure of optical scanning device G, an embodiment of this invention which might be used in a bar code reader or optical sensor unit. FIGS. 10(a) and 10(b) show, respectively, a perspective view and a cross section of the mount for the optical scanner in scanning device G. Optical scanning device G comprises, for example, an optical scanner E with the detector device 24 shown in FIG. 8; a signal processor 31 to process the output signals from device 24; and an output unit 32, which would be able to detect the scanning position and vibrational state of driven segment 5 and output to the exterior the operating state of vibrator 1. Output unit 32 could have an alarm 33, which would go off when driven segment 5 experienced excessive shock or vibration and a display 35, with an LED 34 or the like, to display the scanning angle of the light beam α emitted by the light source. It could then display the vibrational state of driven segment 5 and the scanning state of light beam α. If optical scanning device G should experience excessive shock or vibration while it is operating, alarm 33 would go off, causing device G to stop. The display using LED 34 allows the operator to verify, by eye, the scanning state of the light beam.

As can be seen in FIGS. 10(a) and 10(b), optical scanner E is packaged in casing 37, which is surrounded by damper 36. This damper 36 absorbs shock and vibration originating in the exterior and prevents optical scanner E from experiencing shock directly. This arrangement prevents damage to vibrator 1 in optical scanner E, and more specifically, it prevents damage to deformable shaft 3 and stop 11. It also prevents vibrator 1 from being separated from drive source 2. It does not matter what material is used for damper 36, as long as its elastic modulus is sufficiently small. Rubber sheeting might be used, or cotton, or another material. Damper 36 could also be constructed from springs or cantilevered beams functioning as leaf springs. Optical scanner E would then be mounted on a casing 37 supported by these springs or beams. Such a scanning device, with a variety of display functions and an alarm, would be easier to operate and more convenient than its predecessors.

Figure 11:
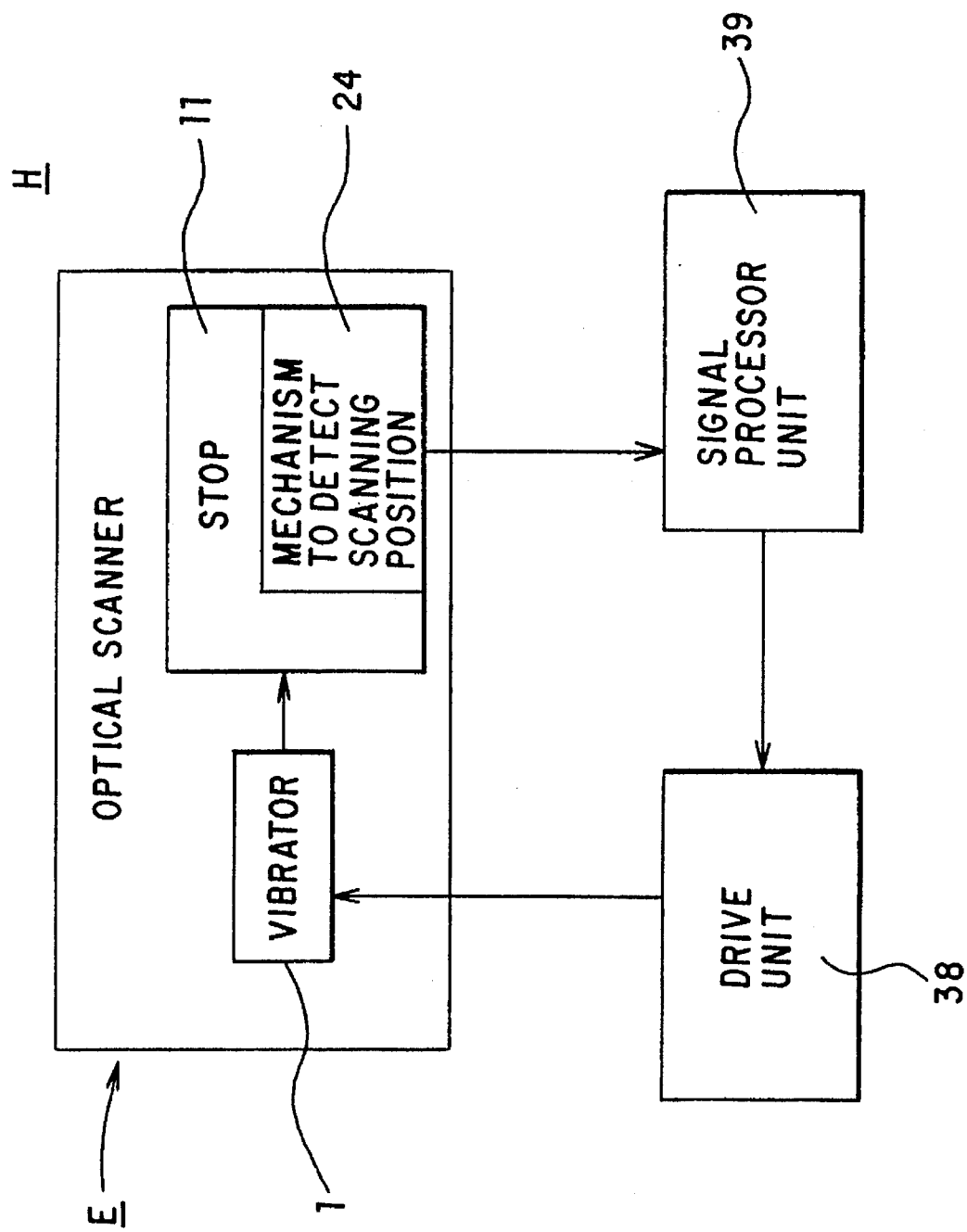
FIG. 11 is a block diagram of an optical scanning device which is another embodiment of this invention.

It would also be possible to construct an optical scanning device H, as shown in FIG. 11, with a signal processor 39. Such a signal processor 39 could process the output signals from detector device 24 and use feedback to control drive unit 38, which applies a voltage to drive source 2 to cause vibrator 1 to vibrate. In optical scanning device H, the scanning state of light beam α is detected, and drive source 2 is driven in response to this state. In this way, more stable scanning (a more stable scanning angle) can be achieved.

FIG. 12 is a perspective view of optical scanner I, yet another embodiment of this invention. Scanner I has two stops 41, which are fashioned to the left and right of driven segment 5 on damper 36, on which scanner I is mounted. A weight 42 is furnished on the underside of driven segment 5 in such a way that segment 5 is free to vibrate. Each stop 41 has an indentation 44 which curtails the movement of one of tabs 43, aliform appendages on either side of the front end of driven segment 5. The inner surfaces of indentations 44 are coated with rubber sheeting, plastic, or some other substance with a sufficiently small elastic modulus. Stops 41 may be made entirely of such a substance, or they may be made as a single piece with damper 36. Indentations 44 on stops 41 are fashioned so as to prevent vibration which exceeds the elastic limit value of deformable shaft 3. If vibration exceeding the limit value is induced in the vertical plane (the plane of the X axis), the upper and lower surfaces of tabs 43 come in contact with the upper and lower surfaces of the indentations on stops 41, thus curtailing the movement of driven segment 5. If vibration exceeding the limit value is induced in the horizontal plane (the plane of the Y axis), the left and right ends of tabs 43 come in contact with the sides of the indentations on stops 41 to suppress the movement of driven segment 5. If deformable shaft 3 buckles in the axial plane (the plane of the Z axis), the ends of tabs 43 come in contact with the inner surfaces of the indentations on stop 41 to suppress the movement of driven segment 5. In this way optical scanner I is protected from vibration due to shock or other vicissitudes.

FIG. 13(a) shows a perspective view of optical scanner J, yet another embodiment of this invention. FIG. 13 (b) is a perspective view of vibrator 1 in optical scanner J. Tab 43, which protects driven segment 5 from vibration exceeding its elastic limit value in both the horizontal and vertical planes, is fashioned on the front end of that element. On the underside of segment 5 is a weight 42. Stop 46, which has a slot 48 to accept tab 43, is fashioned on top of damper 36, on which optical scanner J is mounted. Vibration of driven segment 5 in either the horizontal or vertical plane which exceeds its elastic limit value is suppressed when tab 43 comes in contact with the interior surfaces of the slot in stop 46. Cut-out stop 47 is furnished on either side of deformable shaft 3 in such a way that it will not hinder elastic deformation of that shaft which does not exceed the width of driven segment 5. Buckling of deformable shaft 3 in the axial plane is suppressed when the end of driven segment 5 comes in contact with the rear surface of cut-out stop 47.

Optical scanner J has two separate stops, stop 46, which damps vibration in the vertical and horizontal directions, and stop 47, which prevents buckling in the axial direction. Compared, for example, to stop 11 in optical scanner B (FIG. 2) or stop 41 in optical scanner I (FIG. 12), these stops have a much simpler construction, which allows both their size and their part count to be reduced. Their use, then, would contribute to the downsizing of an optical scanner or optical scanning device and improve its ease of assembly, as well as reducing its cost.

Tab 43 and stop 46 are provided on the front end of driven segment 5. Cut-out stop 47 is on both sides of deformable shaft 3. This configuration is a simple way to insure that a light beam α striking or reflected by driven segment 5 will have a wide optical path. The use of such an optical scanner J will impose minimal restrictions on the configuration of an optical scanning device such as a bar code reader or optical sensor unit, and it can easily be used in such a device.

Figure 14:
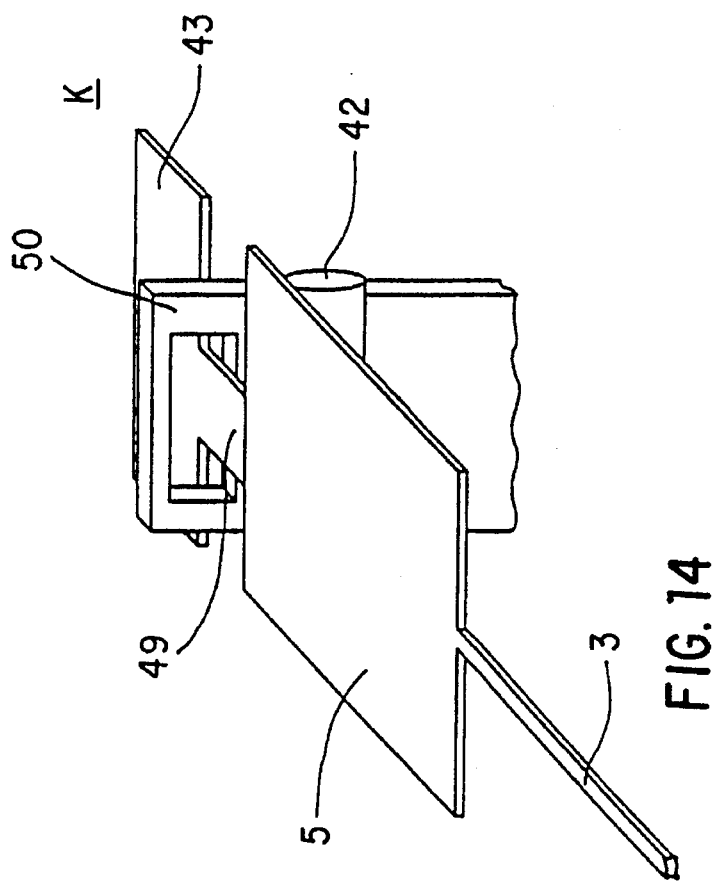
FIG. 14 is a cut-away perspective view of an optical scanner which is yet another embodiment of this invention.

FIG. 14 shows a cut-away perspective view of optical scanner K, another embodiment of this invention. Tab 43, which is on the front end of driven segment 5, has a narrow neck 49. In optical scanner K, stop 50 has the form of a rectangular frame surrounding the neck 49 of tab 43. Stop 50 suppresses vibration which exceeds the elastic limit value in up-down and side-to-side directions. It also curtails severe buckling of deformable shaft 3 in the axial direction. Stop 50 surrounds tab 43 at the neck 49 which has been fashioned on it. Thus a single stop 50 has both the function of stop 46 and that of stop 47. Stop 50 can have a simple configuration, and it frees up a large space around driven segment 5.

Figure 15A:
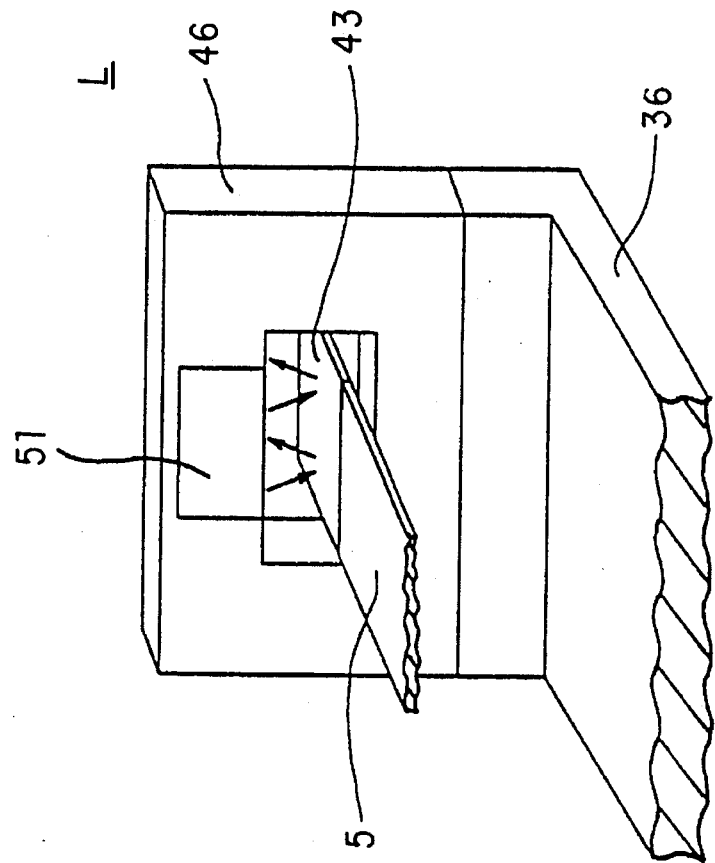
FIGS. 15(a) and 15(b) are enlarged cut-away perspective views of an optical scanner which is yet another embodiment of this invention.
Figure 15B:
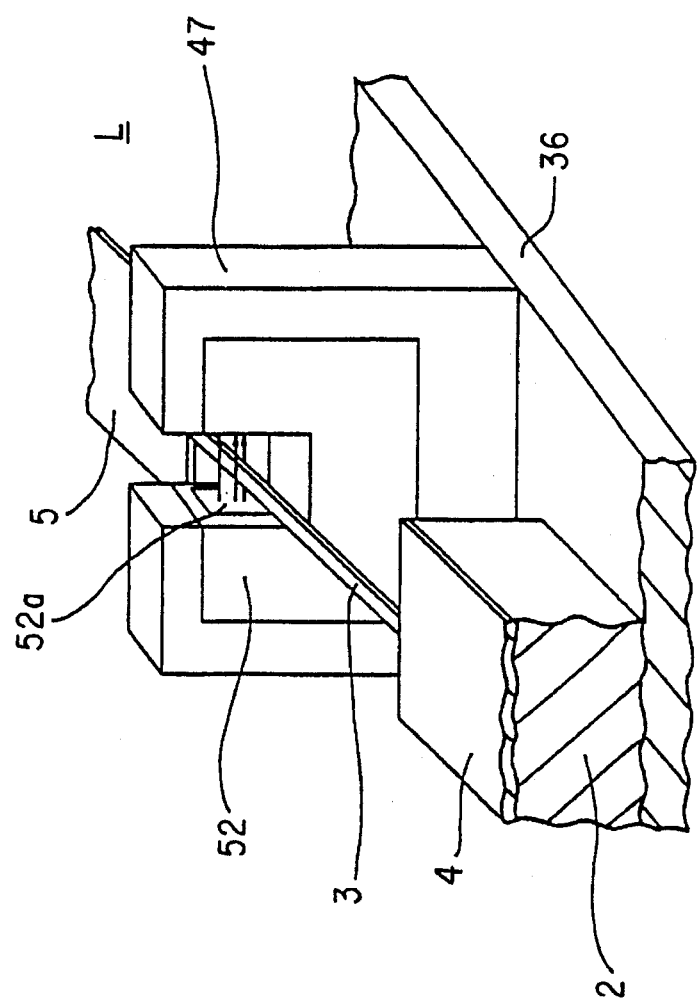

Both optical scanners J and K can be equipped with a detector device 24 to detect the scanning position of driven segment 5, as in optical scanners E and F in FIGS. 7 and 8. FIGS. 15(a) and 15(b) are enlarged cut-away perspective views of optical scanner L, another ideal embodiment of this invention. On the inner surface of stop 46, above tab 43 (FIG. 15(a)) is a reflection-type optical microswitch 51. The optical signal emitted by microswitch 51 is reflected by tab 43, and the reflected optical signal is detected by a detector segment of microswitch 51. The microswitch 51 outputs a signal which corresponds to the optical signal it has detected. In this way, any abnormal vibration of tab 43, and, by the same token, of driven segment 5, can be detected, and the scanning state of segment 5 can be determined. In FIG. 15(b), a number of transmittive optical microswitches are arrayed vertically on the surface of the notch of stop 47 on either side of, and corresponding to, deformable shaft 3. Some of the optical signals emitted by the emitters 52a of optical microswitches 52 are interrupted by deformable shaft 3, and the remainder are detected by detectors (not pictured) provided just opposite the emitters 52a on either side of shaft 3. An output signal from microswitch 52 which is correlated with the optical signal it has received is detected, and abnormal vibration of shaft 3, and therefore of driven segment 5, is detected, and the scanning state of segment 5 is determined. By providing a reflective-type optical microswitch 51 and/or a transmittive-type microswitch 52 on stop 50 in optical scanner K, then, we can detect the scanning state of driven segment 5.

It would also be possible for optical scanner L to have a signal processor unit 31 like that in optical scanning device G in FIG. 9. Processor unit 31 would process the output signals from optical microswitches 51 and 52, and state of vibration of driven segment 5 and the scanning state of light beam α can be displayed on output unit 32. It would likewise be possible to use the output of optical microswitches 51 and 52 in a device like optical scanning device H in FIG. 11 to control drive unit 38 by feedback.

Figure 16:
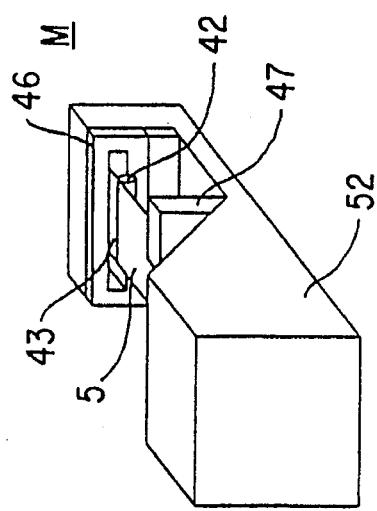
FIG. 16 is a perspective view of an optical scanning device which is yet another embodiment of this invention.

FIG. 16 is a perspective drawing of optical scanning device M, yet another embodiment of this invention. This scanning device has a scanner, for example optical scanner L in FIGS. 15(a) and 15(b), which is enclosed in case 52 in such a way so as not to impede the beam emitted by the light source and reflected by driven segment 5. Optical scanner L is seated on damper 36, a sheet of rubber or some similar material. The inside of case 52 is covered with rubber or plastic sheeting or some other material which can absorb shocks from the exterior. It would also be possible to make the entire case 52 out of plastic or some other substance which can absorb shock. By enclosing scanner L in case 52, we simplify the handling of optical scanning device M. The device can then easily be built into an optical sensor unit or code reader such as a scanner. If optical scanner L is seated on damper 36 and the interior of case 52 is covered with a material capable of absorbing shock, the resulting optical scanning device M will be highly resistant to shock.

Figure 17:
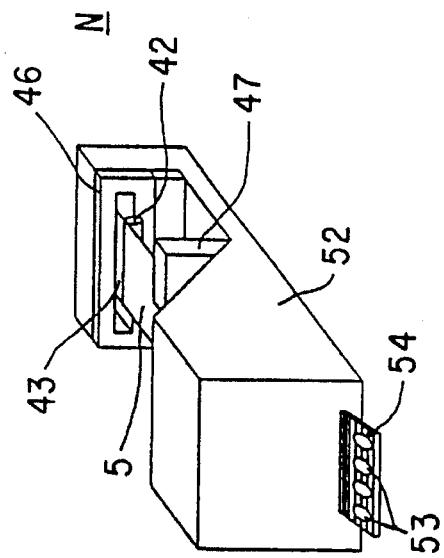
FIG. 17 is a perspective view of an optical scanning device which is yet another embodiment of this invention.

Optical scanning device N, which is pictured in FIG. 17, has a mount 54 on its exterior which may have a screw or socket-type attachment. On mount 54 are connectors 53, which include an input terminal through which the drive voltage from drive unit 38 is input to drive source 2 on vibrator 1; and an output terminal through which an output signal representing the operating state of driven segment 5 is transmitted to the exterior. The provision of such connectors 53 simplifies the wiring of device N, shortens the time required to mount it, and makes it easier to operate. Since mount 54 can easily be attached or removed, optical scanning device N will be comparatively easy to mount. The mount 54 also allows the scanning device to be mounted securely in an optical sensor unit or other device.

Figure 18:
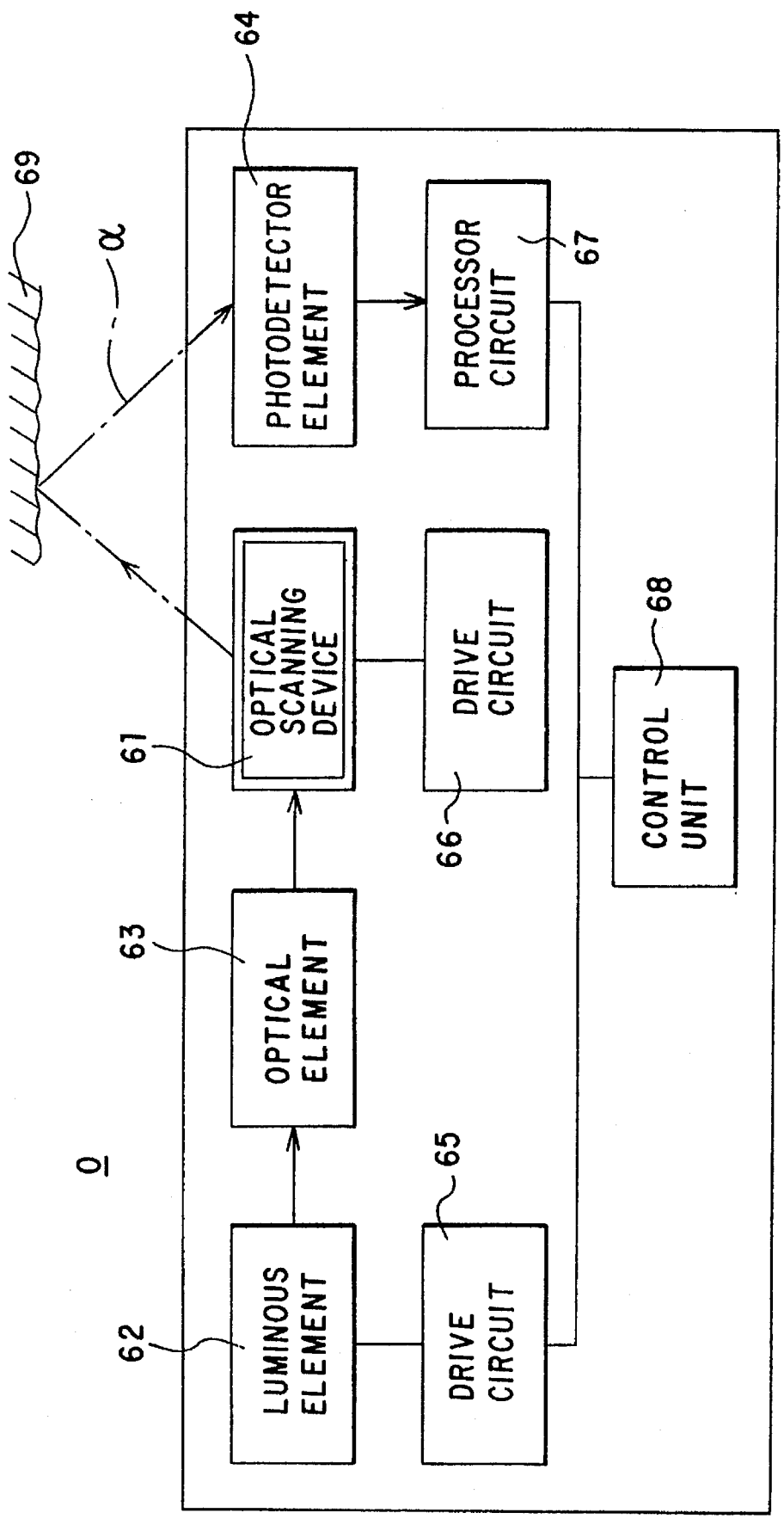
FIG. 18 is a block diagram of an optical sensor unit according to this invention.

FIG. 18 is a block diagram of optical sensor unit O, another embodiment of this invention. Sensor unit O comprises an optical scanning device 61, such as a scanner as described above according to this invention; a light source comprising luminous element 62, a semiconductor laser element or the like, and optical element 63, such as a lens; photodetector 64, such as a photodiode or the like; drive circuit 65, which drives luminous element 62 and causes it to emit light beam α; drive circuit 66, which drives the optical scanner in the scanning device, for example optical scanner B of this invention; signal processor circuit 67, which electrically processes the signal from photodetector 64; and control unit 68, which controls drive circuits 65 and 66 and signal processor circuit 67. In optical sensor unit 0, the light beam α emitted by luminous element 62 is reflected toward the sensing region and scanned within that region. If at that time there is an object 69 in the sensing region, the light beam α reflected by object 69 will be detected by photodetector 64. The signal output by photodetector 64 when it detects light beam α is processed and analyzed by signal processor circuit 67 in order to determine whether there is an object 69 in the sensing region as well as its shape or other characteristics. The result is output to control unit 68.

Figure 19:
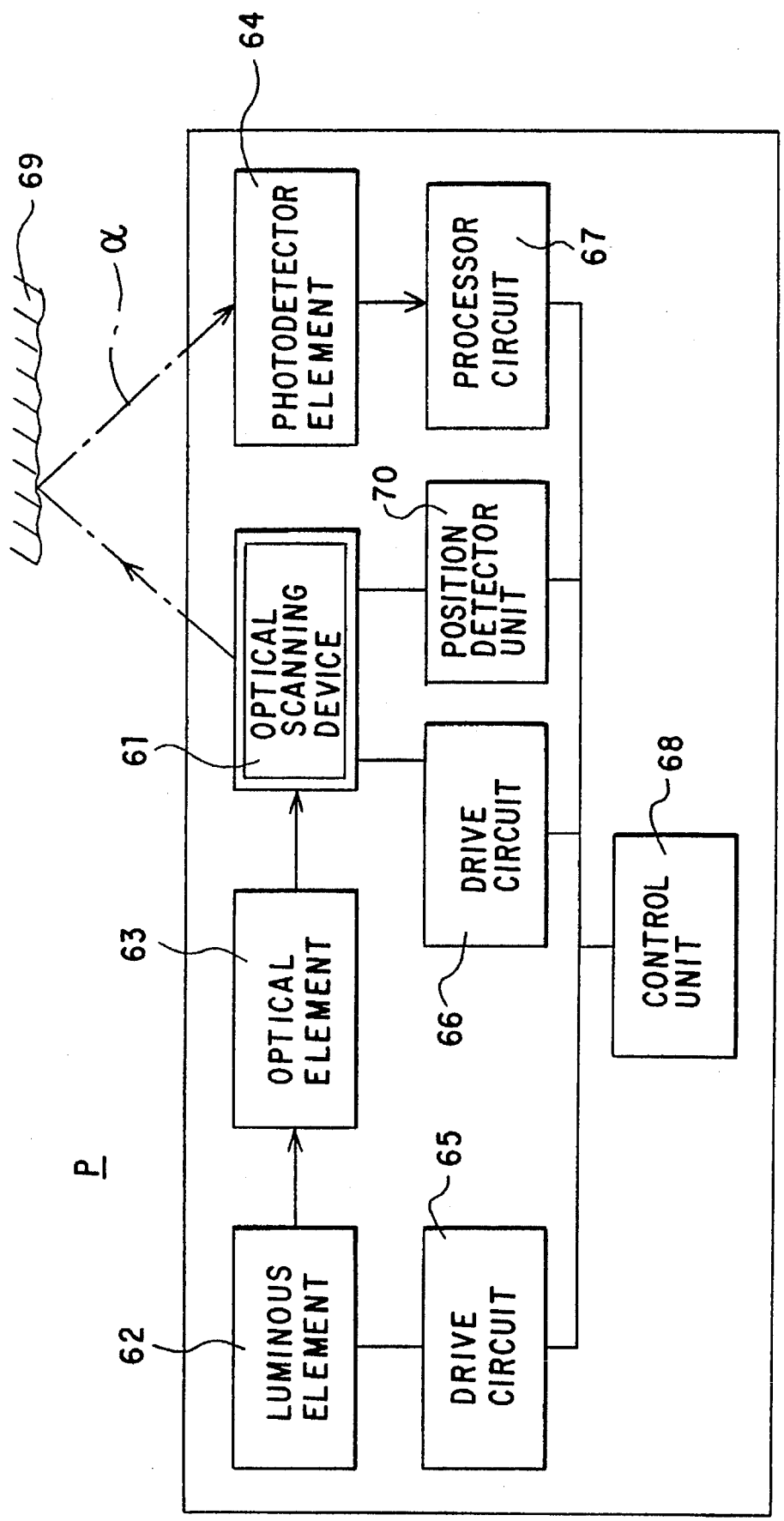
FIG. 19 is a block diagram of another optical sensor unit according to this invention.

FIG. 19 shows optical sensor unit P, another embodiment of this invention, which has a position detector circuit 70 to monitor the scanning position of light beam α. Detector circuit 70 might monitor the position (or direction) of light beam α by monitoring the output signal from detector circuit 24 in optical scanning device 61. When photodetector 64 detects the position of light beam α at that moment, detector circuit 70 can determine the position of object 69 in the scanning region. The position, shape, dimensions and other features of object 69 can be obtained quantitatively, making the sensor unit suitable for use as a scanning micrometer or other device which can measure dimensions.

Figure 20:
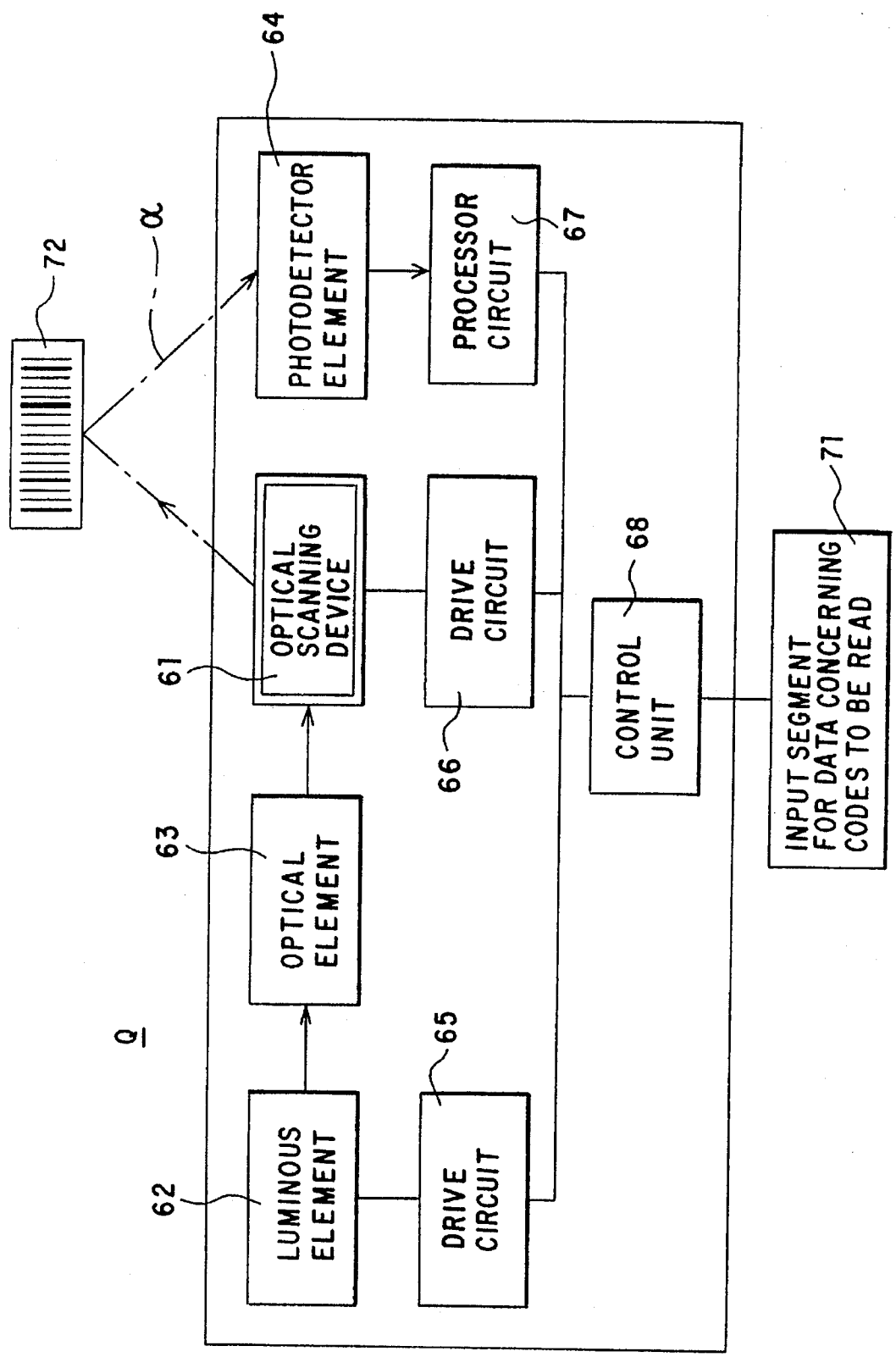
FIG. 20 is a block diagram of a coded data reader according to this invention.

The optical scanning device 61 of this invention could also be used to read coded data 72, which may be a bar code, a multi-stage bar code, a two-dimensional code in the form of a matrix, or some other type of code. In this case, device 61 of this invention could be used in a code reader Q as shown in FIG. 20. Photodetector 64 would detect the reflected light which corresponded to the bars and spaces of the bar code, and signal processor circuit 67 would read the bar code from the signals representing the detected light. Control unit 68 would have an input segment to enter data concerning coded data 72. The operator would use it to enter what type of coded data 72 were to be read, such as a bar code label. When the characteristics of data 72 were entered via input segment 71, the scanning rate of the optical scanner in scanning device 61 could be controlled by control unit 68 according to the type of data 72 being read.

Figure 21:
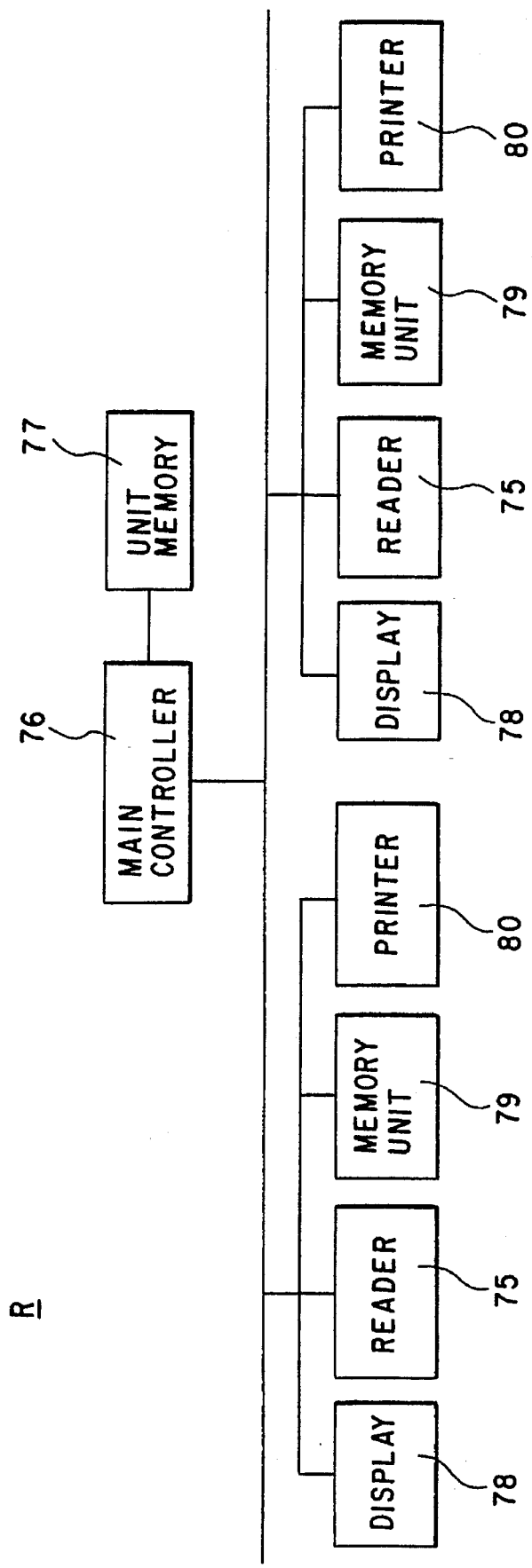
FIG. 21 is a block diagram of a POS system according to this invention.

FIG. 21 is an abbreviated block diagram of POS (Point of Sales Control) system R using this invention. System R has one or more coded data readers 75, which are bar code readers or the like. Data readers 75 read the coded data 72 on labels attached to products. Data concerning the product, such as its name, its price, number in stock, and so on, are stored in memory unit 77, which is attached to main controller 76. When data readers 75 read data 72 off the product, those data are compared with the product data stored in memory unit 77, and certain specified product data are shown on the display 78 which serves each data reader 75. These data are also stored in memory unit 79. The product data stored in memory unit 79 are printed out by printer 80 as needed.

When a data reader P employing an optical scanning device 61 designed according to this invention is used in a POS system for product or stock control, it is unlikely to break when dropped through carelessness. This enhances the reliability of POS system R.

The POS system shown here can be used effectively in a store. In addition, its accuracy makes it suitable for use as a robotic system in which products are transported on a conveyor belt and read automatically.

Here we have discussed an optical scanner highly resistant to external shock and vibration, an optical scanning device employing this optical scanner, and an optical sensor unit and coded data reader employing this optical scanning device. However, the configuration and other features of the optical scanning device shown here are merely given for the sake of example. The invention is not confined to the configuration and shape of the stop, optical scanner and optical scanning device shown in the drawings.

The optical scanner of this invention has a stop to limit the range of movement of the driven segment. The movement of this element is controlled even if the scanner experiences severe shock or vibration. This insures that the driven segment will not exceed the elastic limit value of the deformable shaft. The shaft will not undergo plastic deformation, nor will it sustain damage. The scanning characteristics of the light beam will not be affected, and the resulting optical scanner will be strongly resistant to shock and vibration.

The mirror surface which reflects the light beam is made somewhat smaller than the driven segment, and the stop makes contact with the portion of the element which does not have a mirror surface. This insures that the mirror surface will not be degraded so that the light beam can be scanned in a stable fashion over a long period of time.

A simple stop can be constructed by providing at least one hole in the driven segment and inserting a rod into this hole.

By providing the stop and the tab on the front end of the driven segment, we can guarantee that the light beam striking or reflected by the mirror on the driven segment will have a wide optical path. As a result, few restrictions will be needed to insure a wide path, and the configuration of the scanning device can be simplified. Because the stop does not come in contact with the mirror surface, the light beam can be scanned in a stable fashion over a long period of time.

If the driven segment and the tab have a narrow portion on the outer periphery of which the stop is provided, the configuration of the stop will be simplified, and the part count and manufacturing cost can be reduced. The configuration of the stop will be simplified even if the stop is located at the outer periphery of the deformable shaft.

If at least the portion of the stop which makes contact with the driven segment; or the portion of that stop which makes contact with the tab; or the portion of that stop which makes contact with the deformable shaft is composed of a substance with a small spring modulus, the shock can be mitigated more effectively when the driven segment or other portion of the scanner makes contact with the stop. This will protect the optical scanner more effectively from shock. If the range of movement of the driven segment is limited so that it is less than the elastic limit value of the deformable shaft, plastic deformation of the deformable shaft can be safely prevented.

If the stop is equipped with a detector device to detect the operating state of the driven segment, several other functions can be provided, including a display to show scanning position and an alarm to indicate severe shock or vibration. Such a device has a feedback controller to allow the scanning of the beam to be controlled by feedback. The use of this device enables us to provide a compact optical scanning device which is strongly resistant to shock and vibration and has a full array of functions.

The third optical scanning device of this invention has a damper to absorb shock and vibration, so as to insure that any shock or vibration experienced by the optical scanning device will not be communicated to the optical scanner. This mitigates the effect of shock on the optical scanner and prevents the vibrator from being separated from the drive source by shock or other accident. It also improves the resistance of the scanning device to shock and vibration.

The use of these optical scanning devices will enhance the mechanical reliability of an optical sensor unit; a data reader which can read the coded data in bar codes; or a POS system employing such a data reader.

What is claimed is:

1. An optical scanner, comprising:

an elastically deformable element;

a vibrational input segment disposed at a first end of the elastically deformable element;

a driven segment disposed at a second end of the elastically deformable element;

a vibration source for inducing vibration in the vibrational input segment, whereby the vibration induced in the vibrational input segment produces elastic deformation of the elastically deformable element and consequent movement of the driven segment; and a stop for limiting a range of the movement of the driven segment.

2. The optical scanner of claim 1, wherein the driven segment includes a mirror surface, and wherein a portion of the driven segment other than the mirror surface comes in contact with the stop.

3. The optical scanner of claim 2, wherein the stop has a window formed therein, the window being configured to allow a light beam emitted by a light source to pass through the window, strike the mirror surface, and then pass back through the window.

4. The optical scanner of claim 1, wherein the stop includes:

a hole formed in the driven segment; and a rod inserted into the hole.

5. The optical scanner of claim 1, wherein the driven segment includes a tab disposed at a front end thereof, wherein the tab comes in contact with the stop during movement of the driven segment.

6. The optical scanner of claim 5, wherein the tab includes a narrow portion, wherein the narrow portion comes in contact with the stop during movement of the driven segment.

7. The optical scanner of claim 1, wherein the elastically deformable element comes in contact with the stop during movement of the driven segment.

8. The optical scanner of claim 1, wherein at least a portion of the stop comes in contact with at least one of the driven segment and the elastically deformable element during movement of the driven segment, and wherein the at least a portion of the stop comprises a substance having a small spring modulus.

9. The optical scanner of claim 1, wherein the range of movement of the driven segment is limited by the stop to within an elastic limit of the elastically deformable element.

10. The optical scanner of claim 1, wherein the stop includes a detector device for detecting an operating state of the driven segment.

11. The optical scanner of claim 10, wherein the detector device comprises:

a luminous element disposed on the stop, the luminous element projecting a beam of light onto the driven segment such that the beam of light is reflected by the driven segment; and a photo detector element disposed on the stop to receive the reflected beam of light.

12. The optical scanner of claim 10, wherein the detector device comprises:

a luminous element disposed at a first side of the driven segment; and a photo detector element disposed at a second side of the driven segment opposite the first side and positioned to receive a beam of light emitted by the luminous element;

wherein the detector device detects a variation of a quantity of the beam of light received by the photo detector element.

13. The optical scanner of claim 10, wherein the detector device comprises:

a luminous element disposed at a first side of the driven segment; and a photo detector element disposed at a second side of the driven segment opposite the first side and positioned to receive a beam of light emitted by the luminous element;

wherein the detector device detects a variation of a quantity of the beam of light received by the photo detector element.

14. The optical scanner of claim 10, wherein the detector device comprises:

a first electrode disposed on the stop; and a second electrode disposed on the driven segment to oppose the first electrode;

wherein the detector device detects a change in capacitance in a region between the first and second electrodes.

15. The optical scanner of claim 10, wherein the detector device detects a scanning position of the driven segment.

16. An optical scanning device, comprising:

an optical scanner, the optical scanner including
an elastically deformable element,
a vibrational input segment disposed at a first end of the elastically deformable element,
a driven segment disposed at a second end of the elastically deformable element,
a vibration source for inducing vibration in the vibrational input segment, whereby the vibration induced in the vibrational input segment produces elastic deformation of the elastically deformable element and consequent movement of the driven segment, and
a stop for limiting a range of the movement of the driven segment;

a detector device for detecting an operating state of the driven segment; and a feedback controller for controlling the vibration source in accordance with the operating state detected by the detector device.

17. The optical scanning device of claim 16, further comprising an output unit for providing an indication of the operating state detected by the detector device.

18. The optical scanning device of claim 17, wherein the output unit provides a visual indication of the operating state detected by the detector device.

19. The optical scanning device of claim 17, wherein the output unit provides an aural indication of the operating state detected by the detector device.

20. The optical scanning device of claim 16, wherein the optical scanner is contained within a package surrounded by a damper to absorb shock and vibration.

21. An optical sensor unit for detecting a quality of an object, the quality including at least one of a presence and shape of the object, the optical sensor comprising:

a light source;

an optical scanning device, the optical scanning device including
an optical scanner, the optical scanner including
an elastically deformable element,
a vibrational input segment disposed at a first end of the elastically deformable element,
a driven segment disposed at a second end of the elastically deformable element to deflect a beam of light emitted by the light source at the object,
a vibration source for inducing vibration in the vibrational input segment, whereby the vibration induced in the vibrational input segment produces elastic deformation of the elastically deformable element and consequent movement of the driven segment, and a stop for limiting a range of the movement of the driven segment, and a detector device for detecting an operating state of the driven segment, and a feedback controller for controlling the vibration source in accordance with the operating state detected by the detector device;

a photo detector for detecting an intensity of the beam of light reflected at the object by the driven segment; and a detector circuit for processing an output of the photo detector to detect the quality of the object.

22. A coded data reader for reading coded data, the coded data including at least one of a bar code, a multi-stage bar code, and a two-dimensional code in the form of a matrix, the coded data reader comprising:

a light source;

an optical scanning device, the optical scanning device including an optical scanner, the optical scanner including
an elastically deformable element,
a vibrational input segment disposed at a first end of the elastically deformable element,
a driven segment disposed at a second end of the elastically deformable element to deflect a beam of light emitted by the light source at the object,
a vibration source for inducing vibration in the vibrational input segment, whereby the vibration induced in the vibrational input segment produces elastic deformation of the elastically deformable element and consequent movement of the driven segment, and
a stop for limiting a range of the movement of the driven segment,
a detector device for detecting an operating state of the driven segment, and
a feedback controller for controlling the vibration source in accordance with the operating state detected by the detector device;

a photo detector for detecting the beam of light reflected at the object by the driven segment; and a control unit for processing an output of the photo detector to read the coded data.

23. A POS system comprising:

a coded data reader for reading coded data on a product, the coded data including at least one of a bar code, a multi-stage bar code, and a two-dimensional code in the form of a matrix, the coded data reader including a light source, an optical scanning device, the optical scanning device including an optical scanner, the optical scanner including
an elastically deformable element,
a vibrational input segment disposed at a first end of the elastically deformable element,
a driven segment disposed at a second end of the elastically deformable element to deflect a beam of light emitted by the light source at the object,
a vibration source for inducing vibration in the vibrational input segment, whereby the vibration induced in the vibrational input segment produces elastic deformation of the elastically deformable element and consequent movement of the driven segment, and
a stop for limiting a range of the movement of the driven segment,
a detector device for detecting an operating state of the driven segment, and
a feedback controller for controlling the vibration source in accordance with the operating state detected by the detector device, a photo detector for detecting the beam of light reflected at the object by the driven segment, and a control unit for processing an output of the photo detector to read the coded data;

a first memory for storing product data, the product data including at least one of a name and a price of the product; and a main controller for checking the coded data read by coded data reader against the product data stored in the first memory to produce a checking result, for displaying the checking result, and for storing the checking result.

* * * * *